United States Patent

[11] 3,583,435

| [72] | Inventor | Buster D. Stewart |
| | | 11548 Bonham, Lake View Terrance, Calif. 92353 |
| [21] | Appl. No. | 855,829 |
| [22] | Filed | Sept. 8, 1969 |
| [45] | Patented | June 8, 1971 |

[54] LEAK DETECTOR VALVE ASSEMBLY
20 Claims, 11 Drawing Figs.

[52] U.S. Cl. .................................................... 137/551,
137/559; 625.35, 48/193, 73/46
[51] Int. Cl. .................................................. F16k 37/00;
[50] Field of Search .................................................. 73/46;
137/312, 551, 559, 625.28, 625.33, 625.35;
48/193; 73/47

[56] References Cited
UNITED STATES PATENTS

| 330,267 | 11/1885 | Smith | 48/193 |
| 2,707,390 | 5/1955 | Beretish | 73/46 |
| 3,340,723 | 9/1967 | Harris et al. | 73/46X |

FOREIGN PATENTS

| 882,148 | 7/1949 | Germany | 48/193 |

*Primary Examiner*—Henry T. Klinksiek
*Attorney*—Roman A. DiMeo

ABSTRACT: A valve assembly for detecting leaks in fluid systems which includes an airtight transparent cup means at least partially filled with liquid and a plunger means provided with an orifice and a tube means interconnecting said orifice and liquid. The valve assembly is connected into the fluid line so as to allow the fluid to pass therethrough unimpeded. Depression of the plunger effectively closes the fluid line except for the passageway afforded by the orifice and the tube positioned in the liquid. The existence of a leak in the fluid system is thereby easily observed by a fluid flow through the liquid, i.e., bubbles, etc.

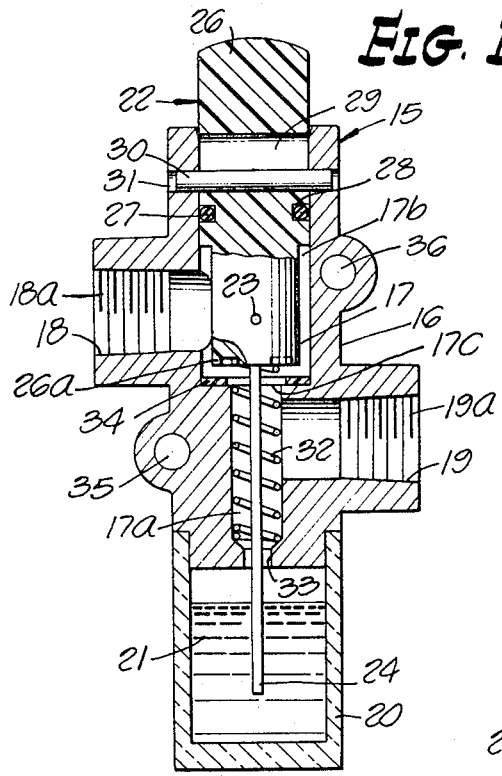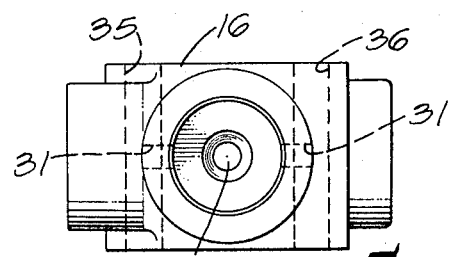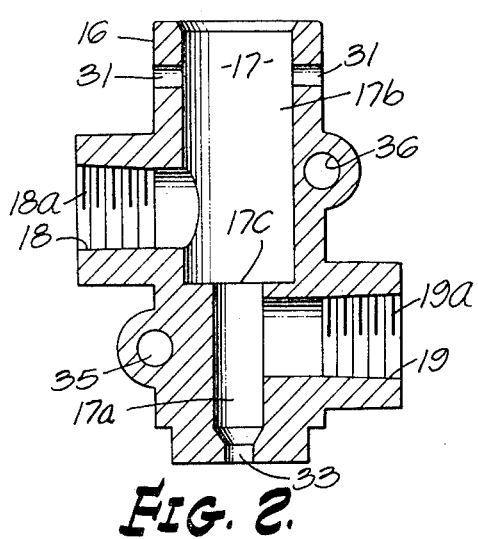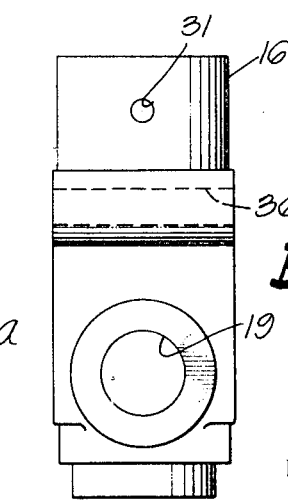

PATENTED JUN 8 1971 3,583,435

INVENTOR
BUSTER D. STEWART
BY
Roman G. D'Ineo
ATTORNEY

LEAK DETECTOR VALVE ASSEMBLY

With the increased usage of fluid and fluid systems, a simple and inexpensive leak detection means is not only desirable from the standpoint of economy, but also as sound safety practice. The foregoing is particularly true in the recreational and low-cost housing fields such as mobile homes, trailers, campers and boats which utilize butane or propane gas systems. Accordingly, timely detection of leaks in the conduits or applicances thereof can prevent hazardous conditions which may result in explosions. Heretofore, however, leak detection devices for fluid systems have either been nonexistent, complicated or expensive. The leak detection valve assembly of the instant invention eliminates the foregoing problems by providing a simple and effective, but inexpensive device for determining the existence of leaks in a fluid system.

The leak detector valve assembly of the instant application is comprised of a body element provided with a double-channeled tubular cavity, one of said channels being interconnected with an inlet opening and the other channel interconnected with an outlet opening. A plunger means provided with an orifice interconnecting an elongated hollow tube is positioned within the internal chamber connected with the inlet opening. A transparent bowl means or the like containing liquid is secured to the body so that at all times a tube means carried by the plunger is immersed therein. The device is installed on the downstream side of the pressure regulator between the fluid supply source, i.e., butane tank, and the using source, i.e., appliance, with the plunger in the normally "open" position. Thus, fluid passing from the supply source through the pressure regulator into the inlet opening of the leak detector valve assembly will pass through both channels of the internal cavity of the body thereof and exit through the outlet opening to the using source. When it is desired to check for leaks in the fluid system or the using source, said using source is turned off so as to avoid drawing fluid from the supply source. Thereafter, the plunger of the leak detector valve assembly is depressed so as to close the opening between the channels of the internal cavity of the body. As a result, the only passageway available for fluid flow is into the inlet opening of the body, through the orifice and the plunger, through the elongated tube means connected to said plunger, into the liquid, and exiting through the chamber interconnected with the outlet opening and through the aforesaid outlet opening. If a leak exists in the fluid system or in the using source, fluid will continue to flow into the leak detector device causing noticeable concomitant bubbles in the liquid contained in the transparent bowl means. Conversely, in the absence of a leak in the fluid system or using source, no fluid will flow and no bubbles will be evident in the liquid contained in said bowl means. Thus, an extremely simple and inexpensive leak detector means is provided.

Accordingly, it is the primary object of this invention to provide a simple and inexpensive leak detector valve assembly for use in fluid systems.

Another object is to provide a simple and inexpensive valve assembly capable of being installed with simple and conventional tools.

Still another object is to provide a simple and inexpensive leak detector valve assembly which is extremely simple to operate.

Other objects and advantages of the invention will become apparent from the description taken in conjunction with the accompanying drawings, in which:

FIG. 1 is a side elevational view, partly in section, illustrating the leak detector valve assembly in its normally open position;

FIG. 2 is a side elevational view, in section, of the body of the leak detector valve assembly shown in FIG. 1;

FIG. 3 is a top plan view of the body illustrated in FIG. 2;

FIG. 4 is a side elevational view of the body illustrated in FIG. 2;

FIG. 5 is an elevational view, partly sectioned, of the plunger of the leak detector valve assembly shown in FIG. 1;

FIG. 6 is a top plan view of the plunger illustrated in FIG. 5;

FIG. 7 is a bottom plan view of the plunger illustrated in FIG. 5;

Figure 10:
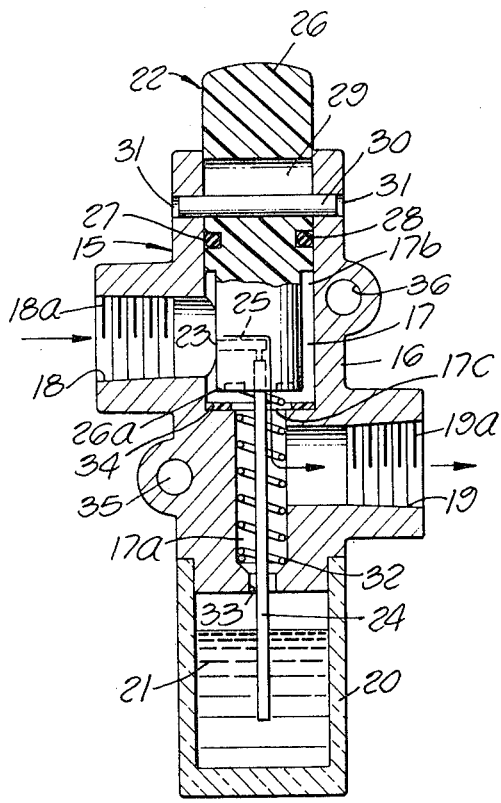
Figure 11:
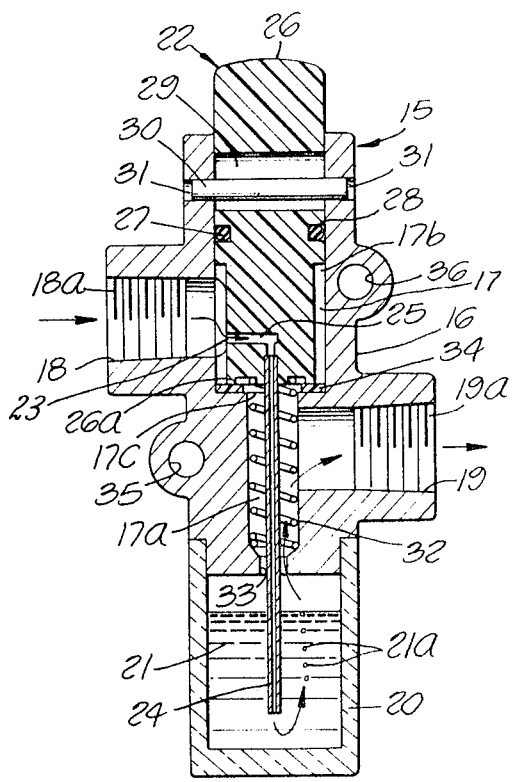
Figure 8:
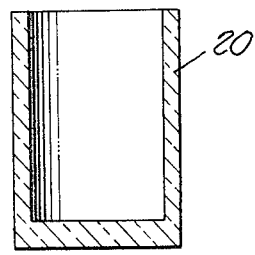
FIG. 8 is an elevational view, in section, of the cup means of the leak detector valve assembly shown in FIG. 1.
Figure 9:
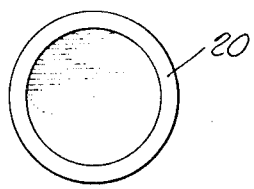
FIG. 9 is a top plan view of the cup means illustrated in FIG. 8.

FIG. 10 is a side elevational view, partly in section, of the leak detector valve assembly similar to that shown in FIG. 1, except that the plunger means thereof has been rotated to partly disclose the interconnection of the plunger orifice and the elongated tube of said plunger, as well as illustrating the fluid flow through the valve assembly; and FIG. 11 is a side elevational view, in section, of the leak detector valve assembly shown in FIGS. 1 and 10, except that the plunger means thereof is in its closed position.

Referring more particularly to FIGS. 1, 10 and 11, reference numeral 15 designates generally the leak detector valve assembly of the instant invention. Valve assembly 15 is provided with a body element 16 having a cavity 17 divided into internal chamber 17a and expanded internal chamber 17b. Internal chamber 17b is intersected by an inlet opening 18, and internal chamber 17a is intersected by an outlet opening 19. The inlet and outlet openings are both provided with conventional threads 18a and 19a, respectively, for interconnection in a fluid system. A screen or filter means (not shown) may, if desired, be secured across inlet opening 18 between threads 18a and body cavity 17 so as to prevent solid impurities from entering body cavity 17 for reasons which will hereinafter become obvious.

A transparent cup means 20 partially filled with liquid 21 is securely attached to body 16 by permanently cementing or by threaded engagement therewith. The liquid 21 contained in said cup means 20 may be of any kind in which the fluid of the system is not readily soluble. A liquid such as conventional "antifreeze" is very desirable in that it is easier to detect bubbles created therein, as will hereinafter be more fully described, and does not readily freeze at low temperatures.

A plunger means 22 having a small orifice 23 and an extended hollow tube 24 connected to said orifice by a bleeder passageway 25 is positioned in the body cavity 17. The body portion 26 of plunger 22 is snugly situated in the expanded internal chamber 17b so as to provide a tight leakproof engagement. To insure against the escape of fluid from the system through the plunger and valve body interface, O-ring 27 is positioned in annular groove 28 carried by plunger body 26. Plunger body 26 is further provided with a large transverse aperture 29 passing therethrough. Retaining pin 30 which is accommodated in lateral opening 31 provided by body 16 passes through the large lateral aperture 29 of plunger body 26 so as to provide controlled axial movement of plunger body 26 thereby preventing outward axial disengagement of plunger 22 from the valve body 16.

Spring means 32 positioned in internal chamber 17a abuts against the bottom of said chamber and the forward end of plunger body 26 so as to maintain plunger 22 in a normally "open" position, i.e., from being disposed in the juncture of internal chamber 17a and expanded internal chamber 17b. The maximum axial outward movement of plunger 22 is limited by pin 30 which is accommodated in lateral aperture 29 carried by plunger body 26, as aforesaid. While in this position, relatively uninhibited fluid flow is permitted into inlet opening 18, through internal chambers 17a and 17b so as to exit out of external opening 19 (see arrows in FIG. 10).

Hollow tube 24 which axially projects from plunger body 26 so as to extend through internal chamber 17a of body cavity 17 through aperture 33, interconnects said internal chamber 17a and the cavity of cup means 20 so that the forward end of tube 24 is immersed in the liquid 21 contained in cup means 20.

Butane or propane gas systems such as used in mobile homes, trailers, campers, boats and the like typically consist of a pressure gas source, i.e., a tank, pressure regulator and shutoff valve connected to the tank and conduit means interconnecting the pressure regulator and shutoff valve with the applicances utilizing the gas, such as stoves, lights, etc. In such a system the leak detector valve assembly is connected into the fluid system as an integral part thereof between the regulator and shutoff valve and the using appliances. The leak detector valve assembly is positioned in said fluid line so that the gas in the system from the tank source passes through the pressure regulator into the inlet opening 18 of valve assembly 15.

Since spring means 32 maintains plunger 22 in a normally "open" position, the gas in the system will flow into expanded internal chamber 17b of cavity 17 and internal chamber 17a so as to exit via outlet opening 19 to the using appliance. Although a portion of the gas in the system will occasionally deviate from its main course and pass through orifice 23 into bleeder passageway 25, through the hollow tube 24 into the liquid 21 or pass from internal chamber 17a through aperture 33 into the liquid 21 thereby causing bubbles to form in the liquid, the occurrence of said bubbles will not be interpreted as an open valve or appliance nor indicate the presence of a leak in the system since plunger 22 is not in the operative or test position. However, upon the application of an axial force or pressure upon plunger 22, spring means 32 will be compressed and said plunger will be axially depressed until the continuous annular protruding edge 26a of the forward end of the plunger body 26 is in tight engagement with the nonmetallic sealing ring 34 positioned about restricted opening 17c of body cavity 17. Thus, a tight mechanical seal is provided whereby internal chamber 17a and outlet opening 19 are sealed from expanded internal chamber 17b and inlet opening 18, except for the passageway provided by orifice 23, bleeder passageway 25 and hollow tube 24.

If, while the leak detector valve assembly is in a test position, the using appliances are turned off and no leak exists in the fluid system, the fluid pressure on either side of the leak detector valve assembly would be balanced without a fluid flow occurring. However, if an appliance is left on or a leak exists in the fluid system, a fluid flow will exist which for the reasons hereinabove described will cause gas to flow into the leak detector valve assembly via inlet opening 18, through orifice 23 of the plunger body, through hollow tube 24 into liquid 21, causing formation of gas bubbles 21a.

The gas entrapped in bubbles 21a, not being soluble in liquid 21, will pass through orifice 23 into internal chamber 17a so as to exit via outlet opening 19 to the point of the leak or open appliance. Thus, by merely observing the formation of bubbles in liquid 21 while plunger 22 is in the test position, the presence of a leak or an open valve in an appliance can be readily detected.

Upon the release of the axial pressure on plunger 22, spring means 32 will return plunger body 26 to its normally "open" position thereby releasing the seal provided by the tight contact of annular edge 26a and nonmetallic sealing ring 34 so as to again allow the fluid in the system to flow relatively unimpeded through valve body 16.

To facilitate the installation of the leak detector valve assembly in a fluid system, securing means comprised of screw or bolt holes 35 and 36 are provided. The length of holes 35 and 36 is such that they are coextensive with the thickness of the valve body 16 to accommodate an inlet and outlet connection on the left and right side, respectively, or vice versa.

While one embodiment of the invention has been described, it is, of course, understood that the particular embodiment of the invention herein disclosed is for illustrative purposes only.

I claim:
1. A leak detector valve assembly, comprising:
a body, said body being provided with an internal cavity and inlet and outlet openings interconnecting said cavity;
a normally open plunger means positioned in said body cavity, said plunger means being axially displaceable within said cavity so as to substantially close said body cavity between the inlet and outlet openings, said plunger means being provided with bleeder means and an elongated tubular means interconnected therewith for conducting fluid through said plunger means;
means engaging said plunger means for returning said plunger means to a normally open position;
container means secured to said body; and
a liquid contained in said container means.

2. A leak detector valve assembly as described in claim 1, wherein said internal cavity is comprised of a plurality of internal chambers, one of said chambers being interconnected by the inlet opening and another of said chambers being interconnected by said outlet opening.

3. A leak detector valve assembly as described in claim 2, wherein a restricted opening is situated between the internal chamber interconnected by the inlet opening and the internal chamber interconnected by the outlet opening.

4. A leak detector valve assembly as described in claim 3, wherein said restricted opening is adapted to be closed by the plunger means when said plunger means is displaced from its normally open position.

5. A leak detector valve assembly as described in claim 4, wherein said restricted opening is provided with an annular shoulder means thereabout.

6. A leak detector valve assembly as described in claim 5, wherein an annular nonmetallic sealing ring is seated on said annular shoulder surrounding said restricted opening.

7. A leak detector valve assembly as described in claim 6, wherein said inlet and outlet openings are linearly misaligned relative to each other.

8. A leak detector valve assembly as described in claim 3, wherein the bleeder means provided by the plunger means is comprised of an orifice and a bleeder passageway interconnecting said orifice.

9. A leak detector valve assembly as described in claim 8, wherein said plunger means is accommodated in the body cavity chamber interconnecting the inlet opening and the elongated tubular means of said plunger means extends through the body cavity chamber interconnecting the outlet opening.

10. A leak detector valve assembly as described in claim 9, wherein the elongated tubular means extends through an aperture in the body and into the container means secured to said body.

11. A leak detector valve assembly as described in claim 10, wherein the elongated tube means extends below the liquid level of the liquid contained in said container means.

12. A leak detector valve assembly as described in claim 11, wherein the plunger means is provided with a continuous annular edge axially protruding therefrom.

13. A leak detector valve assembly as described in claim 12, wherein an annular nonmetallic sealing ring is seated on said annular shoulder surrounding said restricted opening for receiving the annular edge of said plunger means.

14. A leak detector valve assembly as described in claim 13, wherein the plunger means is provided with a sealing means to form a tight engagement between the external walls of the plunger means and the internal walls of the body cavity chamber in which the plunger means is situated.

15. A leak detector valve assembly as described in claim 14, wherein the sealing means is comprised of an O-ring partially accommodated in an annular groove carried by said plunger means.

16. A leak detector valve assembly as described in claim 13, wherein the plunger means is provided with a means for limiting the axial displacement of the plunger means relative to the body.

17. A leak detector valve assembly as described in claim 16, wherein the means for limiting the axial displacement of the plunger means is comprised of an elongated pin passing transversely through an opening in the plunger means and which pin has the ends thereof located in oppositely positioned openings in the body.

18. A leak detector valve assembly as described in claim 2, wherein the body chamber cavity which interconnects the outlet opening is provided with an internal abutment shoulder.

19. A leak detector valve assembly as described in claim 18, wherein the means for returning the plunger means to a normally open position is a coil spring.

20. A leak detector valve assembly as described in claim 19, wherein the coil spring is positioned in intimate contact with the forward end of the plunger means and the internal abutment shoulder provided by the body chamber cavity which is interconnected by the outlet opening.